United States Patent
Seyedi-Esfahani

(10) Patent No.: US 8,149,943 B2
(45) Date of Patent: Apr. 3, 2012

(54) SPACE TIME CODED MB-OFDM UWB SYSTEM

(75) Inventor: Seyed-Alireza Seyedi-Esfahani, Fairport, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 878 days.

(21) Appl. No.: 12/067,345

(22) PCT Filed: Sep. 22, 2006

(86) PCT No.: PCT/IB2006/053451
§ 371 (c)(1),
(2), (4) Date: Mar. 19, 2008

(87) PCT Pub. No.: WO2007/034448
PCT Pub. Date: Mar. 29, 2007

(65) Prior Publication Data
US 2008/0247483 A1    Oct. 9, 2008

Related U.S. Application Data

(60) Provisional application No. 60/720,088, filed on Sep. 23, 2005.

(51) Int. Cl.
*H04B 7/02* (2006.01)
*H04L 27/00* (2006.01)
(52) U.S. Cl. ......................... 375/267; 375/259
(58) Field of Classification Search .................. 375/267, 375/260, 259
See application file for complete search history.

(56) References Cited

U.S. PATENT DOCUMENTS

2003/0219080 A1*  11/2003  Alamouti et al. ............. 375/299
2004/0179626 A1*  9/2004  Ketchum ...................... 375/265

FOREIGN PATENT DOCUMENTS

| EP | 1379020 A1 | 7/2004 |
| WO | 03003672 A2 | 1/2003 |
| WO | 2005034387 A2 | 4/2005 |

OTHER PUBLICATIONS

K. Ki-Nam et al., "Improvement of the Transmission Efficiencies with Transmit Diversity Scheme in Multi-Band OFDM Systems", 7th Int'l Conference on Advanced Communication Technology ICACT 2005, vol. 1, Feb. 2005, pp. 39-43, XP002422498.

(Continued)

*Primary Examiner* — David C. Payne
*Assistant Examiner* — Brian J Stevens
(74) *Attorney, Agent, or Firm* — Larry Liberchuk

(57) ABSTRACT

An MB OFDM system that includes a coder, responsive to a stream of at least one incoming symbol, to form therefrom a set including channel symbols that correspond to each incoming symbol, such that the channel symbols include the incoming symbol, the negative of the incoming symbol, the complex conjugate of an incoming symbol, and a negative of a complex conjugate of an incoming symbol; an output stage configured to: when two of the channel symbols are complex conjugates of one another, the output stage transforms one of the two channel symbols as the output of a single IFFT and the other of the two channel symbols by a reversal of the index of the output and creates OFDM symbols from the transformed symbols using an IFFT such that the two transformed OFDM symbols are copies of each other with inversed indices.

6 Claims, 3 Drawing Sheets

OTHER PUBLICATIONS

Y.H. You et al., "PAPR Analysis for Multi-Band OFDM Signals", Electronics Letter, IEEE Stevenage, GB, vol. 41, No. 5, Mar. 2005, pp. 261-262, XP006023575.

E.R. Lima et al., "Performance Enhancements in OFDM_WLAN Systems using MIMO Access Techniques", Wireless communication Systems, 2004, IST Int'l Symposium on Mauritius Sep. 2004, Piscataway, Nj, USA, IEEE, Sep. 2004, pp. 433-437, XP010780970.

S.M. Alamouti, "A Simple Transmit Diversity Technique for Wireless Communication", IEEE Journal on Selected Areas in Communications, IEEE Service Center, Piscataway, NJ, USA, vol. 16, No. 8, Oct. 1998, XP011054845.

W. Pongwilai et al., "A new Joint Estimation of Channels and and the Number of Transmit Antennas for OFDM Systems with Antenna Diversity Employing Walsh Hadamard Codes", IEICE Trans. Communication, vol. E87-B, No. 2, Feb. 2004.

M. Ohkawa et al., "Effect of a Multi-Band OFDM-MIMO Systems on Frequency-Selective Propagation Characteristics", IEICE Trans. Communication, vol. E88-B, No. 1, Jan. 2005.

* cited by examiner

SPACE TIME CODED MB-OFDM UWB SYSTEM

The present invention relates to a system, apparatus, and method for a multi-band orthogonal frequency divisional multiplexing (MB-OFDM) ultra-wideband (UWB) system that uses Space-Time Coding (STC) to achieve transmission diversity at low cost and with low power consumption.

In the Multi-band OFDM UWB system, the signal hops over a number of bands. In each hop an OFDM symbol is transmitted over one of the bands. Usually the hopping pattern consists of different bands. This mode is called "Time Frequency Interleaving" or TFI mode. If the hopping pattern only consists of one single band (no hopping) the mode is called "Fixed Frequency Interleaving" or FFI mode.

Multiple antennas can be used at the transmitter or at the receiver (or both) to gain spatial diversity. While the reception diversity—for example, Maximal-Ratio Receive Combining (MRRC)—has better performance, transmission diversity can obtain considerable gain with substantially lower complexity and power consumption. This is mainly due to the fact that transmitters generally involve less complexity and have lower power consumption than receivers. For example, Digital to Analog Converters (DAC) can be implemented with much less complexity and power consumption than Analog to Digital Converters (ADC).

When multiple transmit antennas and a single receive antenna are used, the received signal is an interfering mixture of the multiple transmitted signals. Space -Time Coding enables separating these signals, while achieving a full degree of transmission diversity.

To improve the power consumption, range or data rate of an MB -OFDM UWB system, the system, apparatus and method of the present invention uses a form of spatial diversity, namely, space-time codes. For example, one space-time code (STC) application of the present invention is an MB-OFDM UWB system using an Alamouti Space-Time Block Code applied to each band.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Alamouti Space-Time Block Code:

Alamouti Space-Time Code is a complex orthogonal space-time code (STC) for two antennas, see S. Alamouti, *A Simple Transmit Diversity Technique Tor Wireless Communications*, IEEE J. Select. Areas Comm., vol. 16, pp. 1451-1458, October 1998.

Figure 1:
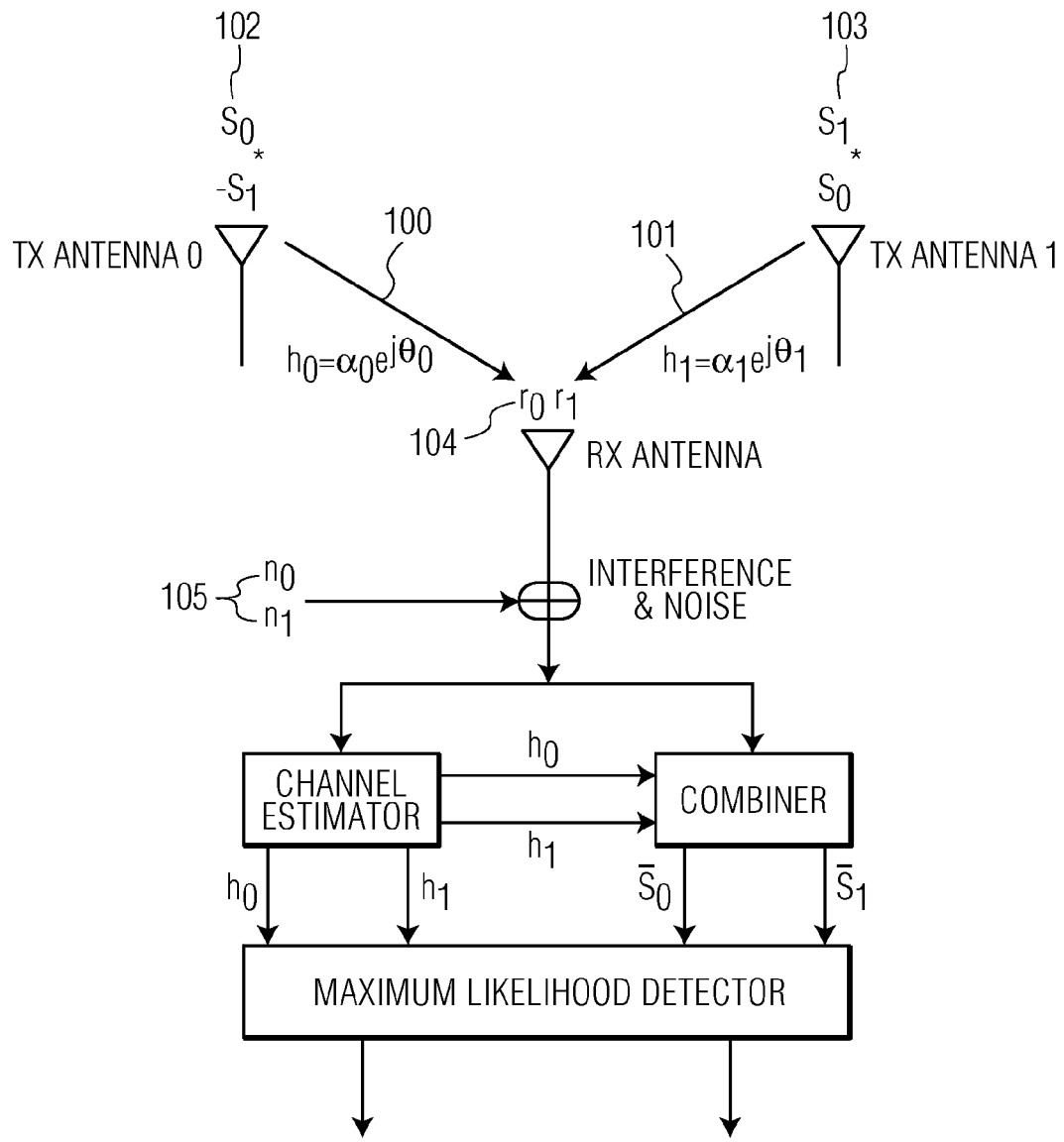
FIG. 1 illustrates a two-transmitter diversity scheme with one receiver that uses a space-time coding scheme according to Alamouti.

Referring now to FIG. 1, the channel between a transmit antenna 0 and the receive antenna is denoted by $h_0$ 100 and between the transmit antenna 1 and the receive antenna is denoted by $h_1$ 101. Four transmit symbols are obtained from two data symbols by, at a given symbol period, simultaneously transmitting two signals from the two antennas, $$s_{0,0} = S_0$$
$$s_{0,1} = S_1$$
$$s_{1,0} = -S_1^*$$
$$s_{1,1} = S_0^*$$

where * represents a complex conjugate, $S_k$ 102 103 are the data symbols and $S_{l,m}$ is the symbol transmitted at time l=0, 1 on antenna m=0, 1. The signal received at the receiver antenna is given by:

$$r_0 = h_0 s_{0,0} + h_1 s_{0,1} + n_0$$
$$r_1 = h_0 s_{1,0} + h_1 s_{1,1} + n_1,$$

where $r_l$ 104 is the symbol received at the antenna at time l=0, 1 and $n_l$ 105 is white Gaussian noise at time l=0, 1. The received symbols are then combined to obtain:

$$\tilde{S}_0 = h_0^* r_0 + h_1 r_1^*$$
$$= (|h_0|^2 + |h_1|^2) S_0 + h_0^* n_0 + h_1 n_1^*$$
$$\tilde{S}_1 = h_1^* r_0 - h_0 r_1^*$$
$$= (|h_0|^2 + |h_1|^2) S_1 + h_1^* n_0 + h_0 n_1^*,$$

which are then sent to a decoder. FIG. 1 illustrates a two-branch transmission diversity scheme with one receiver. It is obvious that this scheme has a similar performance to that of a system with two receive antennas with maximal-ratio receive combining (MRRC), except for 3 dB loss. This loss occurs since the transmit power must be divided over the two antennas. The computational complexity at the base band is similar to that of the MRRC with two receive antennas.

Figure 2:
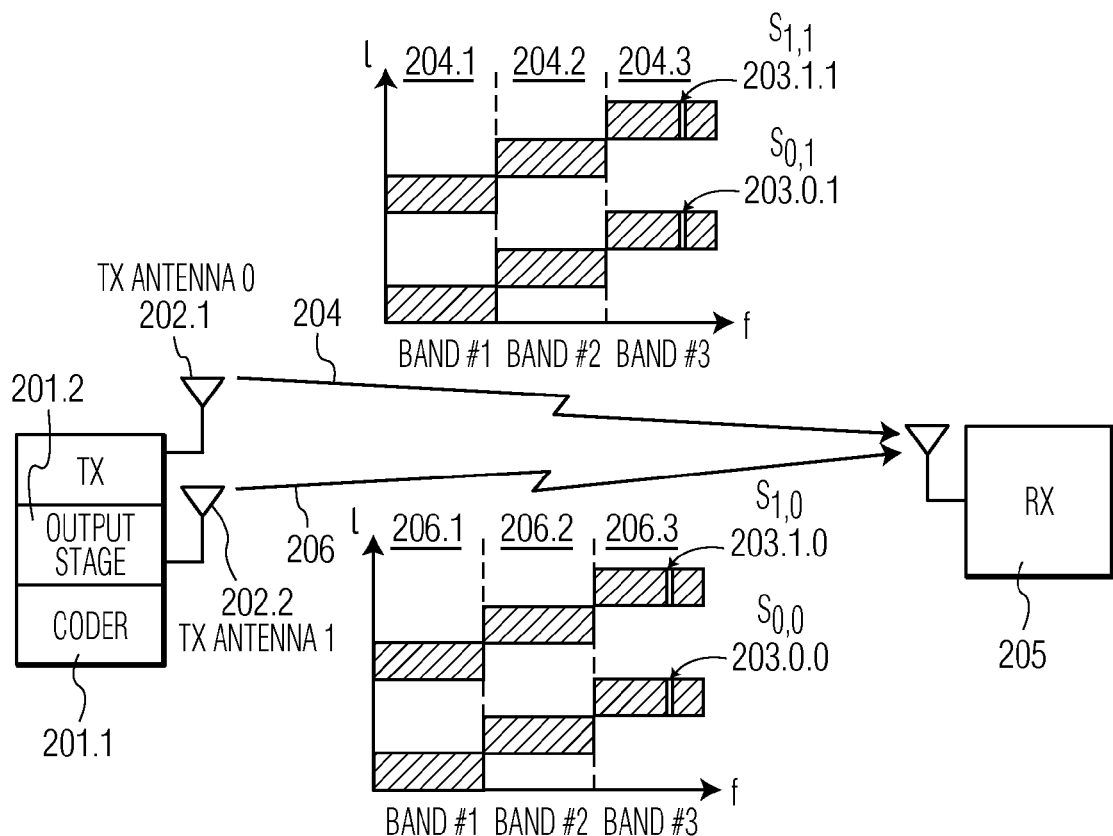
FIG. 2 illustrates an MB-OFDM UWB with 3 bands (hopping pattern {1, 2, 3}) and Alamouti Space-Time Code.

MB-OFDM UWB System with Alamouti Space-Time Block Code:

In a first embodiment of a multi-band orthogonal frequency division multiplexing (MB-OFDM) system, the Alamouti scheme is applied to each sub-carrier. In other words, two symbols, $S_0$ and $S_1$, are modulated using the Alamouti scheme. The resulting $s_{0,0}$ 203.0.0 and $s_{0,1}$ 203.0.1 are transmitted at the same time and on the same sub-carrier, on two transmit antennas 202.1 202.2. The symbols $s_{1,0}$ 203.1.0 and $s_{1,1}$ 203.1.1 are transmitted on the same sub-carrier 204.3 206.3 and over two different antennas 202.1 202.2, but over the (K+1)th OFDM symbol with respect to the original OFDM symbol, where K is the length of the hopping pattern (see FIG. 2). This allows the symbols $s_{0,0}$ 203.0.0 and $s_{1,0}$ 203.1.0 to experience the same channel coefficient, even in the TFI modes where hopping is used. Similarly, for $s_{0,1}$ 203.0.1 and $s_{1,1}$ 203.1.1., the two received values are combined at the receiver 205 as described above.

Figure 3:
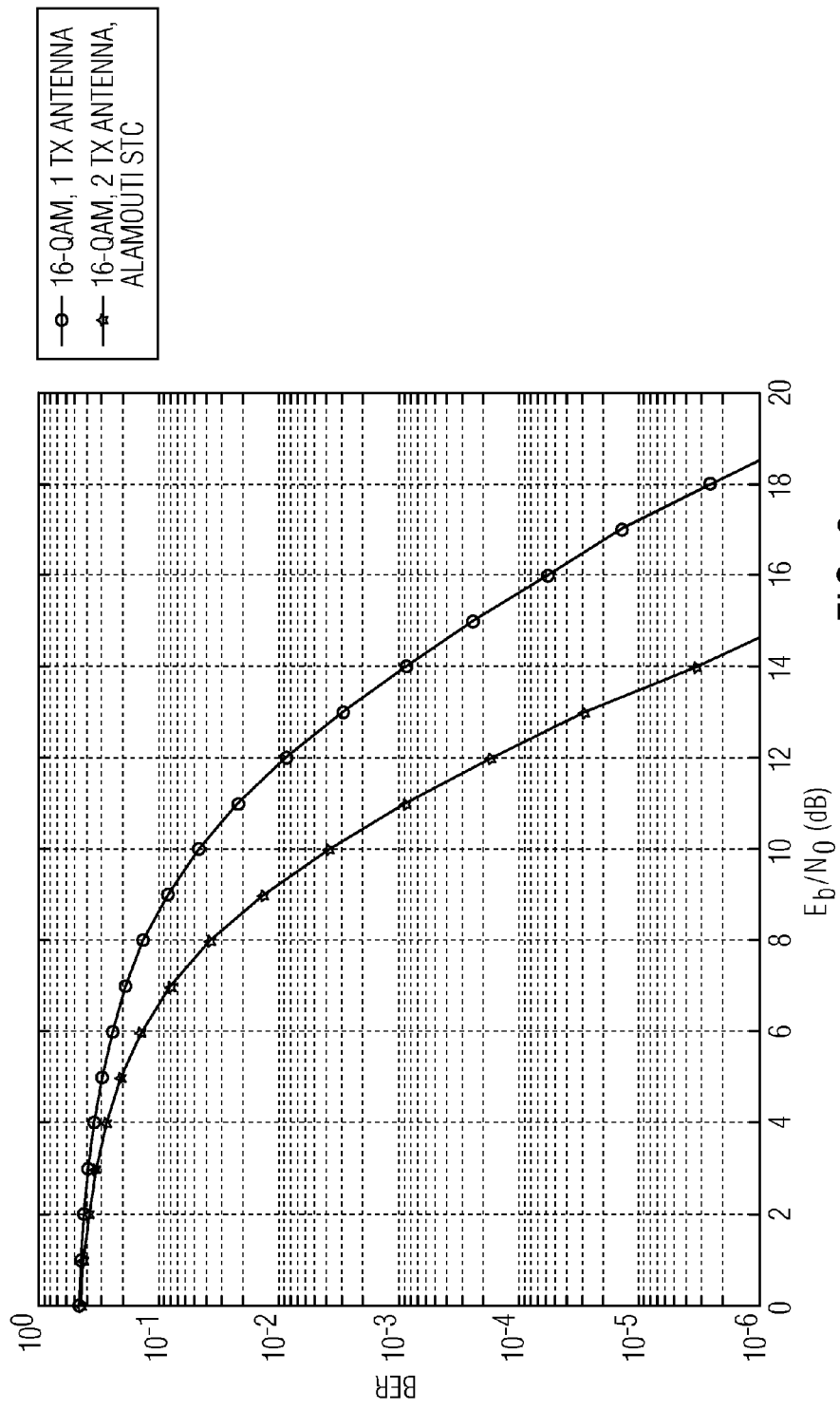
FIG. 3 illustrates the BER Performance of the MB-OFDM UWB system with Alamouti Space-Time Code.

FIG. 3 illustrates the bit error rate (BER) performance of such a system. In FIG. 3 a ¾ rate convolutional code and 16-QAM modulation are used to achieve 1 Gbps rate. From FIG. 3, it can be observed that at a BER of $10^{-5}$ a gain of 3.7 dB is obtained by using the Space-Time Coded MB-OFDM UWB system. Similar gains are achieved when either DCM, or QPSK is used instead of 16-QAM.

Single IFFT Implementation:

In a second preferred embodiment, the required processing at the transmitter takes place in the time domain. This can be done due to the fact that the input to the IFFT for two OFDM symbols ($s_{0,0}$ and $s_{1,1}$) are simply complex conjugates of one another. This means one of the transmitted OFDM symbols can be calculated using one IFFT and the other one is obtained by reversing the index of the output. The same applies to $s_{0,1}$ and $s_{1,0}$ with an additional sign change. Hence, only one IFFT operation per OFDM symbol is required for each OFDM symbol (each hop).

This invention can be applied to MB-OFDM UWB systems to achieve spatial diversity at low cost and with low power consumption. This can be essential in reaching a reasonable range at higher data rates (e.g., 1 Gbps). It can also improve the performance (range) for the existing data rates.

While the preferred embodiments of the present invention have been illustrated and described, it will be understood by those skilled in the art that the apparatus and system architecture and method as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the appended claims.

I claim:

1. An MB OFDM system comprising:
a coder, responsive to a stream of at least one incoming symbol, to form therefrom a set including a plurality of channel symbols that correspond to each at least one incoming symbol, such that the channel symbols that correspond to each at least one incoming symbol include the incoming symbol, the negative of the incoming symbol, the complex conjugate of an incoming symbol, and a negative of a complex conjugate of an incoming symbol;
a plurality of antennas;
an output stage configured to:
transform one of the two channel symbols that are complex conjugates of one another as the output of a single IFFT and the other of the two channel symbols by a reversal of the index of the output and create OFDM symbols from the transformed symbols using an IFFT such that the two transformed OFDM symbols are copies of each other with inversed indices;
translate channel symbols that are not complex conjugates of one another to a time domain,
wherein the stream of channel symbols is translated to OFDM symbols; and
apply the OFDM symbols to the plurality of antennas to form a plurality of distinct channels over a transmit medium such that a subset of the plurality of OFDM symbols that correspond to an incoming symbol are simultaneously transmitted on the same subcarrier of a different channel of said plurality of distinct channels by a different antenna of said plurality; and
a receiver having a single antenna that is adapted to receive and decode signals transmitted by the output stage, wherein the stream is space-time coded for transmission.

2. The system of claim 1, further comprising a receiver having a single antenna that is adapted to receive and decode signals transmitted by the output stage.

3. The system of claim 1, wherein the plurality of distinct channels direct transmissions therefrom to a single receiver antenna.

4. The system of claim 1, wherein the coder encodes incoming symbols in blocks of n channel symbols.

5. The system of claim 1, wherein:
the coder encodes incoming symbols in blocks of 2 channel symbols such that each block of 2 channel symbols $\{s_0 \ S_1\}$ is encoded into a first sequence of 2 symbols $\{s_0, -s_1^*\}$ and into a second sequence of 2 channel symbols $\{s_1, s_0^*\}$ where $s_i^*$ is the complex conjugate of $s_i$;
the plurality of antennas consists of a first antenna and a second antenna; and
the output stage applies the first sequence to the first antenna and the second sequence to the second antenna.

6. An MB OFDM transmitter comprising:
a coder, responsive to a stream of at least one incoming symbol, for forming therefrom a set including a plurality of channel symbols that correspond to each at least one incoming symbol such that the channel symbols that correspond to each at least one incoming symbol include the incoming symbol, the negative of the incoming symbol, the complex conjugate of an incoming symbol, and a negative of a complex conjugate of an incoming symbol;
a plurality of antennas;
an output stage configured to:
transform one of the two channel symbols that are complex conjugates of one another as the output of a single IFFT and the other of the two channel symbols by a reversal of the index of the output and create OFDM symbols from the transformed symbols using an IFFT such that the two transformed OFDM symbols are copies of each other with inversed indices;
translate channel symbols that are not complex conjugates of one another to a time domain,
wherein the stream of channel symbols is translated to OFDM symbols; and
apply the OFDM symbols to the plurality of antennas to form a plurality of distinct channels over a transmit medium such that a subset of the plurality of OFDM symbols that correspond to an incoming symbol are simultaneously transmitted on the same subcarrier of a different channel of said plurality of distinct channels by a different antenna of said plurality; and
a receiver having a single antenna that is adapted to receive and decode signals transmitted by the output stage, wherein the stream is space-time coded for transmission.

* * * * *